United States Patent [19]

Leibensperger et al.

[11] Patent Number: 4,500,150
[45] Date of Patent: Feb. 19, 1985

[54] DEVICE FOR ELECTRIFYING DINING TABLE

[76] Inventors: Robert L. Leibensperger; Donna C. Leibensperger, both of 4731 Woodside Ave. NW., Canton, Ohio 44709

[21] Appl. No.: 391,114

[22] Filed: Jun. 23, 1982

[51] Int. Cl.³ .......................................... H01R 25/06
[52] U.S. Cl. ........................................ 339/28; 108/50; 174/48; 339/119 C; 339/132 R
[58] Field of Search ............ 108/50; 312/223; 339/113, 119, 130, 132-134, 147, 163, 164, 125, 28; 174/48, 49

[56] References Cited

U.S. PATENT DOCUMENTS

| | | | |
|---|---|---|---|
| 905,364 | 12/1908 | Raymond | 174/48 |
| 1,184,539 | 5/1916 | Kendelhardt | 108/50 |
| 1,874,828 | 8/1932 | Suss | 339/163 |
| 1,935,771 | 11/1933 | Feurstein et al. | 339/113 L |
| 1,965,087 | 7/1934 | Sharp | 174/48 |
| 1,971,391 | 8/1934 | Bilton | 211/1.6 |
| 2,268,831 | 1/1942 | Klein | 108/23 |
| 2,271,463 | 1/1942 | Reeves | 339/119 C |
| 2,429,026 | 10/1947 | Liebscher | 339/130 C |
| 2,866,956 | 12/1958 | Miller et al. | 339/34 |
| 3,091,748 | 5/1963 | Takes et al. | 339/64 R |
| 3,166,028 | 1/1965 | Zagel | 108/25 |
| 3,181,484 | 5/1965 | Keppler | 108/50 |
| 3,219,765 | 11/1965 | Pless | 339/119 C |
| 3,290,453 | 12/1966 | Jensen | 339/119 R |
| 3,361,508 | 1/1968 | Chassevent | 312/239 |
| 3,930,116 | 12/1975 | Richards | 339/119 C |
| 4,094,256 | 6/1978 | Holper et al. | 108/50 |

FOREIGN PATENT DOCUMENTS 219234 7/1924 United Kingdom ............ 339/132 T

Primary Examiner—Neil Abrams
Attorney, Agent, or Firm—Michael Sand Co.

[57] ABSTRACT

A device for attaching to the underside surface of a dining table which is connectable to a receptacle mounted in the floor beneath the table. The device has a generally T-shaped base with an electric receptacle box attached thereto which contains a plurality of plug receptacles, a circuit breaker, a power ON-OFF switch and a condition-indicating light. A plurality of hook formations are located adjacent the receptacle box for releasably holding the ends of one or more electrical cords from appliances such as coffee pots, bun warmers, hot plates, etc., resting on the table surface. A pair of reel-forming hooks are formed on the elongated leg portion of the T-shaped base to provide a storage reel for an electrical supply cord connected to the receptacle box. The supply cord is adapted to be connected to the floor-mounted receptacle for energizing the receptacles mounted on the base. The floor-mounted receptacle includes a tubular sleeve of dielectric material having a plug-in receptacle mounted in the upper end thereof. A closure cap is removably mounted in the upper end of the receptacle sleeve to conceal the receptacle when the device is not in use and when the power supply cord is disconnected and is placed in stored position on the reel hooks.

15 Claims, 12 Drawing Figures

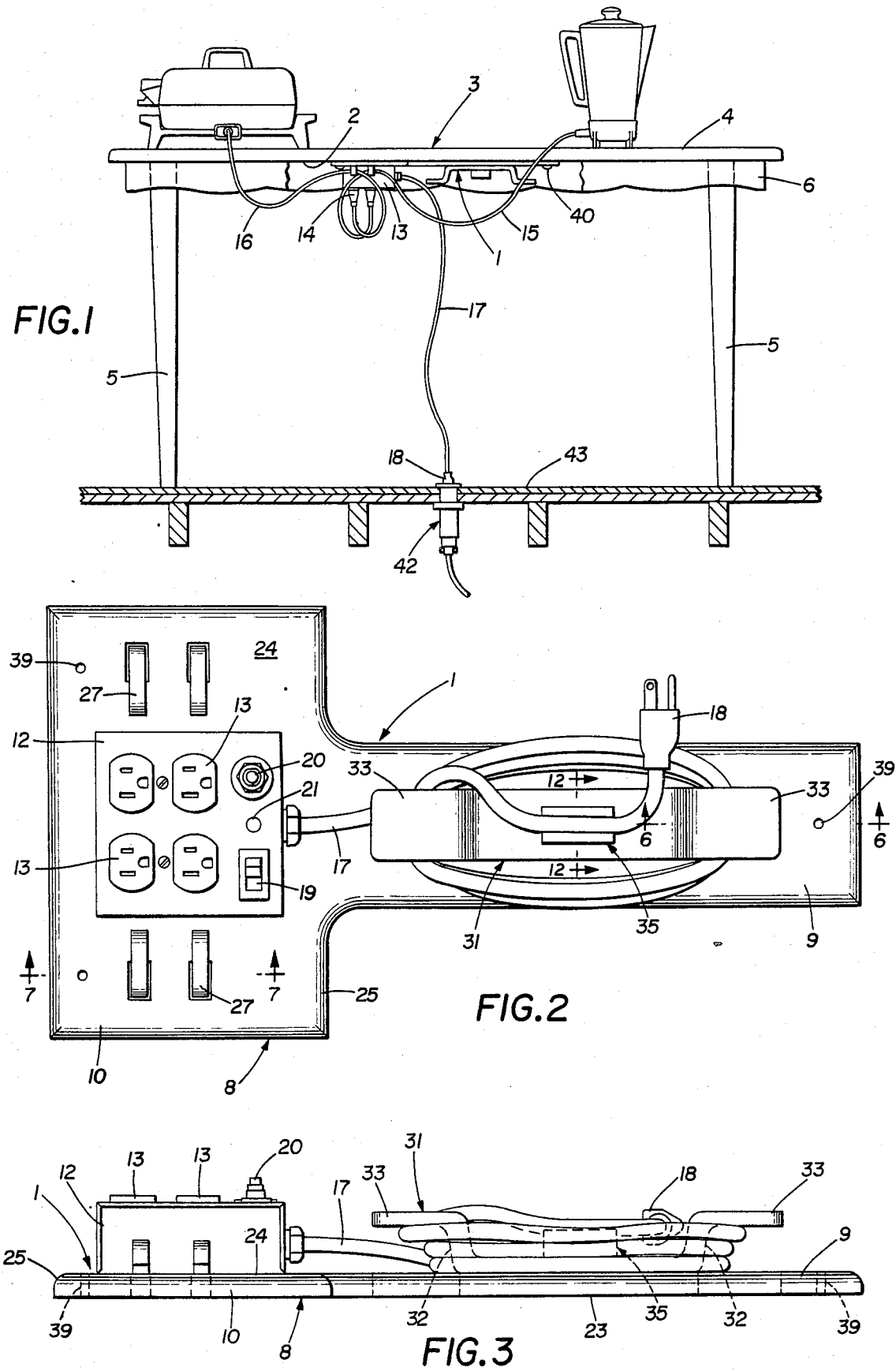

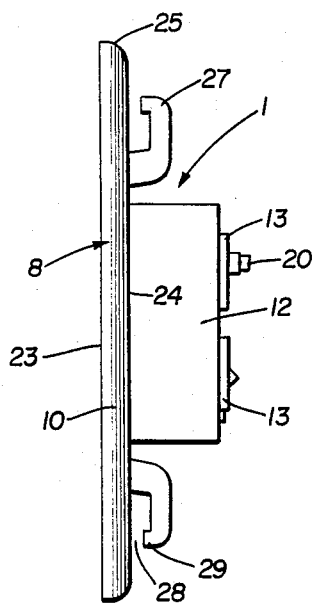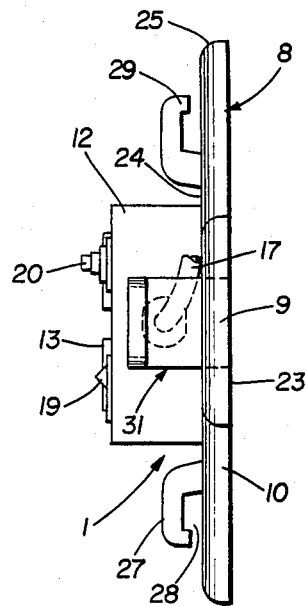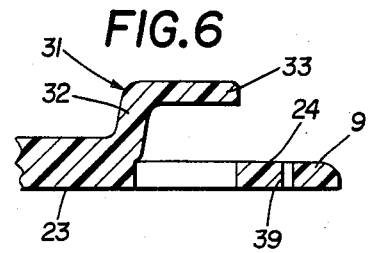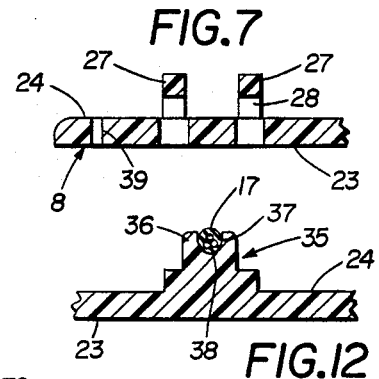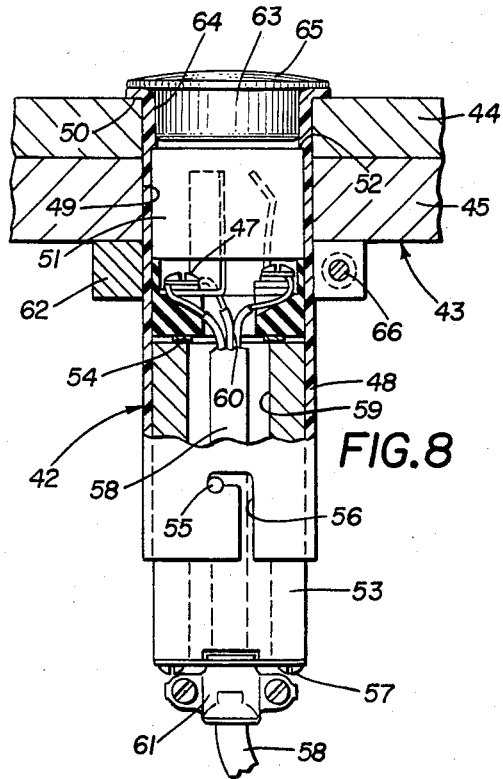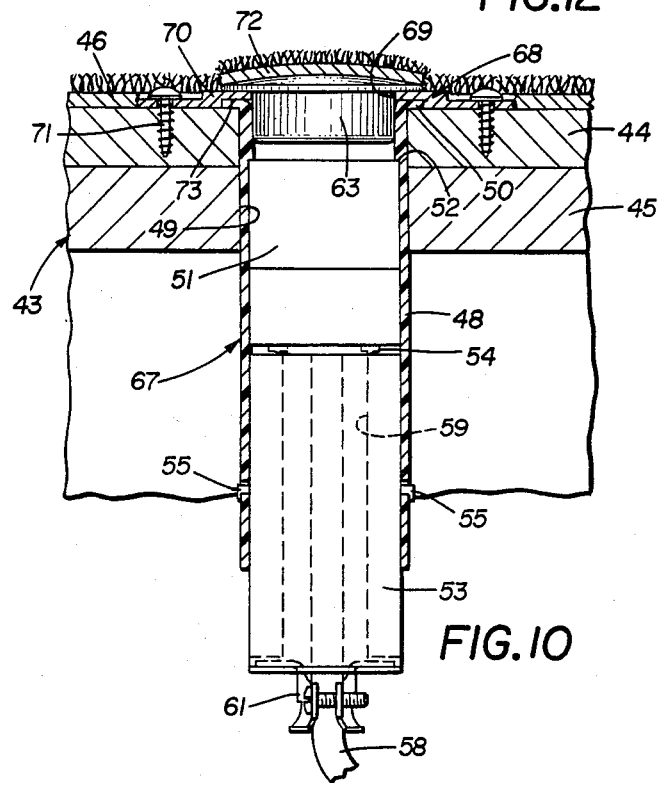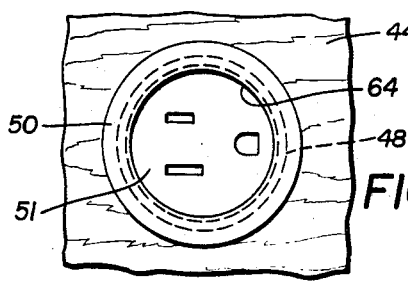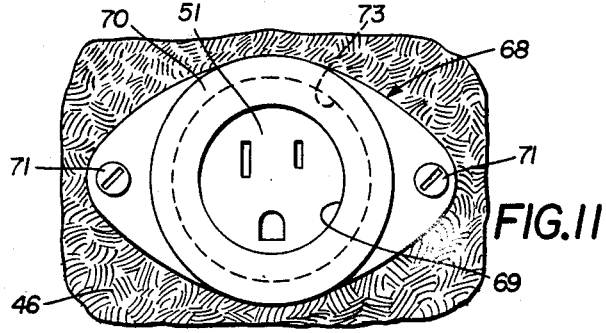

DEVICE FOR ELECTRIFYING DINING TABLE

BACKGROUND OF THE INVENTION

1. Field of the Invention

The invention relates to dining or serving tables and in particular to a device which provides a source of electricity for various appliances placed on top of a table to eliminate the appliance cords from extending across the floor and dining area to wall receptacles. More particularly, the invention relates to a device which is mounted on the underside surface of the table and is connectable to an electric receptacle mounted in the floor beneath the table whereby the cords of various appliances on the table are required only to extend over the edge of the table for connection to the device.

2. Description of the Prior Art

There are a considerable number of electrical appliances which are used during the serving of a meal, or of hors d'oeuvres during a cocktail party, some of which are placed on the dining or serving tables, such as an electric wok, electric coffee pot, bun warmer, heated serving tray, electric fondue pot, and the like. It is preferable that these appliances be located at the dining table and not at a separate location to facilitate the serving of the meal. For example, at a formal-type dinner or dinner party, it eliminates the server from continually leaving guests and the dining table to obtain the food or beverage being warmed by the particular electric appliance. Also, during a cocktail party the dining table is an ideal place to locate the hors d'oeuvres.

Therefore, amny homemakers will place these appliances on the table and connect them to an electrical wall receptacle by on or more extension cords. This requires the appliance cords to extend across the table and floor to the wall receptacle. These cords present an unsafe and hazardous condition, occasionally resulting in someone accidentally tripping over the cord either injuring that person or someone at the table by a heated liquid being spilled on the individual. At the very least, the affected appliance will spill its contents on the table causing a disturbance to the diners and embarrassment to the individual causing the accident.

Various tables, such as laboratory tables, work tables and benches, etc., have been provided with electrical receptacles mounted thereon for receiving the plug end of appliances, tools, and lights. However, these receptacles usually are built into the table or are exposed which would be unsatisfactory for a dining table. Also, these prior types of electrified tables or benches do not permit an existing table to be electrified easily, conveniently and inexpensively.

Therefore, the need has existed for a device which can be mounted in an inconspicuous place on a dining table with which the plug ends of appliance cords ar engaged for connecting various electrical appliances placed on top of the table to a source of electric power, eliminating the cords from extending across the floor to wall receptacles, and in which the device can be adapted for use with both new and existing tables. There is no known device of which we are aware which provides a solution to these problems.

SUMMARY OF THE INVENTION

Objectives of the invention include providing a device which can be mounted on the underside surface of a new or existing dining table which is connectable to a source of electric power for energizing a plurality of electric appliances placed on the top of the table, which appliances have the plug ends of their cords connected to receptacles mounted in the device thereby requiring the appliance cords to extend only along the table and over the edge to the device mounted beneath the table, and in which the device is connected to the source of electric power by means of a receptacle mounted in the floor of the dining room beneath the table. Another objective is to provide such a device which includes a mounting base that can be moded relatively inexpensively as an integral one-piece plastic member, which has a generally T-shaped configuration with an enlarged crossbar member, in which a receptacle box containing a plurality of receptacles is mounted on the T-shaped member and has an automatic circuit breaker mounted therein to provide additional protection for the individual appliances connected to the receptacles, in which the device is provided with a main power ON-OFF switch and has a light to indicate whether the receptacle is energized or deenergized, and in which the receptacle box has a main power supply cord for connecting the receptacles to a source of electric power.

Another objective of the invention is to provide such a device in which a power supply cord reel is formed on the mounting base by a generally U-shaped member having a pair of upstanding legs terminating in outwardly oppositely extending flanges around which the receptacle box cord is wound when the device is not in use and which has a cord clip formed between the leg members of the reel for removably holding the plug end of the cord, and in which a plurality of cord clips are formed adjacent the receptacle box for releasably holding the appliance cords so that the weight of the cord does not disengage the plug end from the receptacle slots. Another objective is to provide such a device which can be mounted easily on the underside surface of a dining table by a plurality of screws or other fastening means and in which the device will be hidden by the table's peripheral skirt to eliminate any unsightly appearance to the table and room decor even when the device is being used to supply power to one or more appliances placed on the table.

Another objective is to provide such a device which is connected to an electrical power supply by a receptacle which is embedded in the floor beneath the table, which receptacle has a tubular sleeve of a dielectric material and a plug-in receptacle mounted in the upper portion thereof for receiving the male plug end of the power supply cord extending from the receptacle box mounted on the base plate beneath the dining table. A further objective is to provide such a device in which the floor mounted receptacle is retained in its mounting opening by a collar when the dielectric sleeve is accessible from beneath the floor by way of a basement or crawl space, and in which the sleeve is retained in position by a top plate which is fastened to the floor in those installations where access cannot be obtained to the bottom of the sleeve, in which a closure cap is removably inserted into the open top of the receptacle sleeve for sealing the same when the power supply cord from the receptacle box is not connected to the floor receptacle, and in which the top surface of the closure cap can either be stained to match a surrounding hardwood floor or covered with a patch of carpet to match the surrounding carpet, depending upon the particular floor covering used in the dining room. A still further objective of the invention is to provide such a device which can be mass produced relatively inexpensively and assembled with a minimum of labor, which can be mounted on new or existing tables, which is relatively free of any maintenance or repair problems, which is of a simple construction, which is effective and safe, which achieves the stated objectives in a simple and efficient manner, and which solves problems and satisfies needs existing in the art.

These objectives and advantages are obtained by the improved device for electrifying a dining table, the general nature of which may be stated as including mounting plate means for attaching to the underside surface of a dining table to be electrified; first receptacle means mounted on the plate means for receiving a plug of a cord of an electric appliance placed on the dining table; an electric supply cord connected with the first receptacle means having a plug end; means provided on the plate means for holding the supply cord when in a stored position; and second receptacle means adapted to be mounted in a floor beneath the dining table and connected to a source of electric power for receiving the plug end of the electric supply cord to supply power to the first receptacle means.

BRIEF DESCRIPTION OF THE DRAWINGS

A preferred embodiment of the invention, illustrative of the best mode in which applicant has contemplated applying the principles, is set forth in the following description and is shown in the accompanying drawings, and is particularly and distinctly pointed out and set forth in the appended claims.

FIG. 1 is a diagrammatic elevational view with portions broken away and in section, of a dining table having the improved device attached to the underside surface thereof and having a plurality of electrical appliances connected thereto;

FIG. 2 is an enlarged top plan view of the improved device removed from the table of FIG. 1 with the power supply cord shown in stored positions;

FIG. 3 is a side view of the device shown in FIG. 2;

FIG. 4 is a left-hand end view of the electrical junction shown in FIG. 2;

FIG. 5 is a right-hand end view of the electrical junction shown in FIG. 2 with only a part of the electrical cord being shown;

FIG. 6 is a fragmentary sectional view taken on line 6—6, FIG. 2;

FIG. 7 is a fragmentary sectional view taken on line 7—7, FIG. 2;

FIG. 8 is an enlarged view, portions of which are broken away and in section, of the electrical receptacle mounted in the floor beneath the dining table for connection with the improved device;

FIG. 9 is a top plan view of the floor-mounted receptable shown in FIG. 8 with the top closure cap removed therefrom;

FIG. 10 is a view similar to FIG. 8 showing a modified floor-mounted receptacle;

FIG. 11 is a top plan view of the receptable shown in FIG. 10 with the top closure cap removed therefrom; and FIG. 12 is a fragmentary sectional view taken on line 12—12, FIG. 2.

Similar numerals refer to similar parts throughout the drawings.

DESCRIPTION OF THE PREFERRED EMBODIMENT

The improved device is indicated generally at 1, and is shown particularly in FIGS. 2 through 5. Device 1 is shown in FIG. 1 in an installed position mounted on the underside surface 2 of a dining table, indicated generally at 3. Table 3 is of a usual construction having a hoizontal top 4 supported by a plurality of legs 5, and has a downwardly projecting skirt 6 extending about the periphery of top 4. Although table 3 is shown in the drawings and described as a dining table, it may be a serving table or the like without affecting the concept of the invention.

Device 1 includes a main mounting plate or base, indicated generally at 8, having a T-shaped configuration formed with an elongated leg portion 9 and an enlarged crossbar member 10. A usual receptacle box 12 is attached by screws, bolts or other fastening means on crossbar 10, and has a plurality of receptacles 13 mounted therein for receiving the male plug ends 14 of appliance cords 15 and 16, as shown in FIG. 1. Box 12 and receptacles 13 are of a usual construction with receptacles 13 being connected by internal wiring (not shown) to a power supply cord 17. Cord 17 extends outwardly from one end of box 12 and terminates in a male plug end 18.

A power ON-OFF toggle switch 19 preferably is mounted in receptacle box 12 together with a circuit breaker 20 and a power condition indicating light 21. Circuit breaker 20 provides additional protection to the individual appliances in the event of a malfunction, electrical short or the like, to reduce the dangers to anyone handling the appliances. Mounting plate 8 preferably will have a flat bottom surface 23 (FIGS. 4 and 5) and a flat top surface 24 which are connected by slightly curved peripheral edges 25.

In accordance with one of the features of the invention, a plurality of hook-shaped cord clamps 27 are formed on mounting plate 8 and project outwardly from top surface 24 and are located in a spaced relationship adjacent receptacle box 12. Preferably, the number of cord clamps formed on plate 8 correspond to the number of receptacles 13 mounted in box 12. Cord clamps 27 provide a means for holding the extended ends of appliance cords 15 and 16 adjacent box 12 to eliminate the entire weight of the appliance cord from being applied to the appliance plug ends 14. This prevents plug ends 14 from becoming disengaged from engagement with their respective receptacles 13 due to the weight of the cord. Also, clamps 27 prevent the appliance cords from dangling excessively below table surface 2 where they could become entangled with the diner's legs. The cord is merely inserted beneath the openings 28 formed between plate surface 24 and the downwardly projecting clamp ends 29. Clamps 27 will have a slight resiliency, enabling the cord to be inserted beneath edge 29 and then secured beneath the main body of clamp 27.

In accordance with another feature of improved device 1, a power cord storage reel, indicated generally at 31, is formed on leg portion 9 of mounting plate 8. Reel 31 has a generally U-shaped configuration formed by a pair of upstanding spaced legs 32 which terminate in oppositely outwardly extending cordretaining flanges 33. Flanges 33 preferably are parallel with top surface 24 of mounting plate 8 as shown in FIG. 3. A cord clip 35 (FIG. 12) is formed between reel legs 32 and releasably holds the end of cord 17 adjacent plug end 18 when the device is not in use and cord 17 is in stored position wrapped about reel legs 32. Clip 35 consists of a pair of elongated upstanding projections 36 having curved inner surfaces 37 whih form a semicylindrical recess 38 therebetween into which cord 17 is pressed and releasably secured, a shown in FIG. 2.

In accordance with another of the features of the invention, mounting plate 8 including appliance cord clamps 27, power supply cord reel 31, and cord clip 35, are integrally molded of plastic as a one-piece member. This enables these components to be injection molded in quantity at a relatively low cost yet provide a structure which is durable, and which will not rust or tarnish. Also the plastic material of cord clamps 27 and cord clip 35 possess sufficient resiliency for spreading the retaining members apart for receiving and then contacting to retain a cord therebetween. A plurality of spaced holes 39 are formed in base 8 for mounting device 1 on table surface 2 by a plurality of screws 40. If desired, an adhesive, clamps or other attachment means may be employed for mounting device 1 on table surface 2 without affecting the invention.

In accordance with still another feature of the invention, receptacle box 12 is adapted to be connected to a source of electrical power by an improved floor mounted receptacle, indicated generally at 42 (FIGS. 8 and 10). Receptacle 42 is adapted to be mounted in the area of a floor 43 which is located beneath the center of table surface 2 (FIG. 1). Floor 43 may consist of a hardwood top surface 44 and a subflooring 45 (FIG. 8) and may have carpeting 46 (FIG. 10). Receptacle 42 includes a tubular-shaped sleeve 48 formed of a dielectric material which is inserted through a complementary-shaped hole 49 drilled in floor 43.

Sleeve 48 terminates at its upper end in an outwardly extendin annular flange 50 which abuts against the portion of floor 44 which surrounds hole 49 to assist in retaining sleeve 48 within hole 49. A cylindrical-shaped plug-in receptacle 51 is located in the upper portion of sleeve 48 in abutment with an annular internal shoulder 52 which is located a short distance below top annular flange 50. Plug receptacle 51 is pressed against shoulder 52 by a cylindrical bottom member 53 and a spring washer 54. Cylindrical member 53 is secured in the bottom portion of sleeve 48 by a pair of pins 55 which are engaged in L-shaped slots 56 that are formed in the bottom portion of sleeve 48 or by other fastening means. Member 53 when in the position shown in FIG. 8 compresses spring washer 54 to maintain a constant biasing pressure on the bottom surface of plug receptacle 51 to maintain it in abutting engagement with annular shoulder 52.

An electrical power supply cord 58 which is connected to a remote source of electricl power (not shown) extends through a hollow bore 59 of cylindrical member 53. The individual wires 60 or cord 58 are connected to plug receptacle 51 in a usual manner by screws 47. A clamp 61 mounted on the bottom of cylindrical member 53 by screws 57 (FIG. 8) securely holds supply cord 58 in position with floor receptacle 42. In those installations where the undersurface of floor 43 is accessible as by a basement or crawl space, sleeve 48 is secured in position by an annular split-ring locking collar 62. Collar 62 is telescopically inserted over sleeve 48 and pushed tightly against the bottom of floor 43 and secured in position by a setscrew 66 which squeezes the split ends of the collar together clamping it tightly against sleeve 48.

A closure cap 63 is removably mounted in the open end 64 of sleeve 48 to prevent dirt and other contaminants from dropping into the sleeve and onto connector plug receptacle 51 when device 1 is not in use. Plug 63 has a top surface 65 which may be stained to match the color of hardwood floor 44 (FIG. 8) or may be covered with a small disc 72 of carpet (FIG. 10) to match the surrounding carpeting completely hiding receptacle 42.

FIGS. 10 and 11 show a modified floor-mounted plug receptacle indicated generally at 67, which is used in those installations where access to the underside of floor 43 is not possible. The main difference between receptacle 67 of FIGS. 10 and 11 and receptacle 42 of FIGS. 8 and 9 is that a mounting plate, indicated generally at 68 is used to retain the receptacle within hole 49 instead of collar 62. Plate 68 is a generally flat oval-shaped member having a central opening 69 surrounded by an annular raised boss 70 which forms an annular undercut 73 extending about opening 69. Annular flange 50 of insulated sleeve 48 is positioned within undercut 73 of boss 70 (FIG. 10) and plate 68 clamps flange 50 against the flooring to retain sleeve 48 and the attached components thereof in position within mounting hole 49. A pair of screws 71 fasten mounting plate 69 on floor 44. Closure cap 63 is shown in the embodiment of FIG. 10 as being covered with a disc of carpeting 72 to match the surrounding carpeting.

The operation and preferred use of improved device 1 is shown generally in FIG. 1. Device 1 is mounted on table underside surface 2 by screws 40 or the like of either a new or of an existing table. Power supply cord 17 is in stored position about reel 31 as shown in FIG. 2 until device 1 is ready to be used. Likewise, closure end cap 63 will be mounted within open end 64 of plug receptacle sleeve 48 until device 1 is ready for use. To use device 1, cord 17 is unwound from reel 31 and cap 63 removed from open end 64. Next plug end 18 of cord 17 is engaged with receptacle 51. Appliance cords 15 and/or 16 are plugged into a respective receptacle 13 with the cord being inserted through clip openings 28 whereby cord clamps 27 will suspend the same from mounting plate 8. Power supply switch 19 then can be moved to the "ON" position providing power to the individual appliances on table top 4.

As can be seen from FIG. 1 only a short section of cord will be exposed on the top and sides of table 3, and no cords will extend completely downwardly along the sides of the table to the floor or extend across the floor for insertion into a wall plug. Thus, device 1 completely eliminates lengthly sections of electric cords from extending across the floor to a wall receptacle which heretofore were subject to accidents and unsafe conditions. Furthermore, device 1 enables the table to be electrified by the simple mounting of a device to the underside surface of the table where it is completely hidden from view and where it will not interfere with anyone sitting at the table, and in which the device requires only the installation of a floor-mounted receptacle which can be installed either in a floor accessible from the undersurface thereof, or in a floor having no access to the bottom thereof. The main requirement for installing receptacles 42 and 67 in floor 43 is that power supply line 58 can be connected to the bottom of the receptacle from a remote power source prior to installing the receptacle in mounting hole 49. This usually can be accomplished by "fishing" the wire between floor braces.

Accordingly, the improved table electrification device is simplified, provides an effective, safe, inexpensive, and efficient means which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moroever, the description and illustration of the invention is by way of example, and the scope of the invention is not limited to the exact details shown or described.

Having now described the features, discoveries and principles of the invention, the manner in which the device for electrifying a dining table is constructed and used, the characteristics of the construction, and the advantageous, new and useful results obtained; the new and useful structures, devices, elements, arrangements, parts, and combinations, are set forth in the appended claims.

We claim:

1. A device for electrifying a dining or food serving table including:
   (a) a mounting plate;
   (b) means for attaching the mounting plate to the table, which means is completely concealed beneath the table on the underside surface of the table to be electrified;
   (c) first receptacle means mounted on the plate for receiving a plug of a cord of an electric appliance placed on the upper surface of the table with said cord extending over the table edge;
   (d) an electric supplying cord connected with the first receptacle means having a plug end;
   (e) holding means provided on the plate for holding substantially the entire supply cord wound in a stored position;
   (f) clip means formed on the mounting plate adjacent the first receptacle means for releasably gripping a cord of said electric appliance and for maintaining a subsantial portion of the cord adjacent the underside surface of the table, which cord is connected with the first receptacle means to prevent the plug end of the cord from being pulled from the receptacle; and
   (g) second receptacle means adapted to be mounted in a floor directly beneath the table and connected to a source of electric power for receiving the plug end of the electric supply cord to supply power to the first receptacle means.

2. The device defined in claim 1 in which circuit breaker means is mounted on and is operatively engageable with the first receptacle means for protecting appliances plugged into said first receptacle means.

3. The device defined in claim 1 in which an ON-OFF power control switch is mounted on the first receptacle means and communicates with the power supply cord for selectively energizing and de-energizing the first receptacle means.

4. The device defined in claim 1 in which an indication light is mounted on the first receptacle means to indicate whether said first receptacle means is energized or de-energized.

5. The device defined in claim 1 in which the supply cord holding means is a U-shaped member having a pair of spaced upstanding legs terminating in flanges extending outwardly from the legs in opposite directions with respect to each other.

6. The device defined in claim 5 in which the cord holder clip means is located between the pair of legs for releasably securing the power supply cord adjacent the plug end when the supply cord is in stored position.

7. The device defined in claim 1 in which the mounting plate, supply cord holding means and appliance cord clip means are formed as an integral one-piece member of plastic material.

8. The device defined in claim 1 in which the mounting plate has a T-shaped configuration.

9. The device defined in claim 1 in which the second receptacle means includes a sleeve of dielectric material, a plug-in receptacle mounted within the sleeve for receiving the plug end of the electric supply cord, and means for securing the sleeve within a hole formed in a floor beneath the table on which the device is mounted.

10. The device defined in claim 9 in which spring means is mounted within the sleeve for biasing the plug-in receptacle into abutting engagement with an internal annular shoulder formed in the sleeve.

11. The device defined in claim 10 in which the spring means is a spring washer.

12. The device defined in claim 9 in which the sleeve securing means is an annular collar telescopically mounted on the sleeve and engageable with the undersurface of a floor in which the second receptacle means is mounted.

13. The device defined in claim 9 in which the sleeve securing means is a mounting plate adapted to be fastened into the top surface of a floor in which the receptacle sleeve is mounted; and in which the mounting plate of the sleeve securing means clamps an annular flange formed on the top of the sleeve againt the floor to secure said sleeve in the floor.

14. The device defined in claim 9 in which the sleeve has an open top end to provide access to the plug-in receptacle located within such sleeve and positioned below said top end; and in which a closure cap is removably mounted within the open top end when the plug end of the supply cord is disconnected from the second receptacle means.

15. The device defined in claim 14 in which the closure cap has a top surface which is adapted to match the covering of the floor in which the second receptacle means is installed.

* * * * *